United States Patent
Mashimo

(10) Patent No.: US 7,991,392 B2
(45) Date of Patent: Aug. 2, 2011

(54) COMMUNICATION SYSTEM, INFORMATION PROCESSING APPARATUS, AND COMMUNICATION CONTROL METHOD

(75) Inventor: Hiroshi Mashimo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 631 days.

(21) Appl. No.: 12/143,414

(22) Filed: Jun. 20, 2008

(65) Prior Publication Data

US 2009/0017767 A1 Jan. 15, 2009

(30) Foreign Application Priority Data

Jul. 10, 2007 (JP) ................................. 2007-181448

(51) Int. Cl.
*H04M 3/00* (2006.01)

(52) U.S. Cl. .......... 455/420; 455/418; 455/423; 455/25; 455/63.1; 455/63.4; 455/67.11; 455/67.13; 455/68; 455/69; 455/101; 455/115.1; 455/115.3; 455/226.1; 455/226.2; 455/226.3; 343/173; 343/174; 343/350; 343/354; 375/347; 375/349

(58) Field of Classification Search .......... 455/423–425, 455/25, 418–420, 67.11, 67.13, 67.15, 68–69, 455/561, 562.1, 101, 103, 115.1–115.3, 226.1–226.3, 455/63.1, 63.4; 343/173, 174, 350, 354; 375/347, 349

See application file for complete search history.

(56) References Cited

U.S. PATENT DOCUMENTS

| | | | |
|---|---|---|---|
| 5,625,362 A * | 4/1997 | Richardson | 342/70 |
| 5,799,042 A * | 8/1998 | Xiao | 375/285 |
| 6,856,281 B2 * | 2/2005 | Billington et al. | 342/174 |
| 7,007,217 B2 * | 2/2006 | Fujii et al. | 714/748 |
| 7,130,659 B2 * | 10/2006 | Doi et al. | 455/561 |
| 2005/0075073 A1 * | 4/2005 | Kadous et al. | 455/63.1 |
| 2006/0211379 A1 * | 9/2006 | Mantha et al. | 455/73 |
| 2007/0115180 A1 * | 5/2007 | Kish et al. | 343/700 MS |
| 2007/0183479 A1 * | 8/2007 | Noll et al. | 375/132 |

FOREIGN PATENT DOCUMENTS

JP 06-303220 10/1994

* cited by examiner

*Primary Examiner* — Tuan A Tran
(74) *Attorney, Agent, or Firm* — Cowan, Liebowitz & Latman, P.C.

(57) ABSTRACT

This invention is characterized by a communication system comprising a station with a diversity function and an access point. The station notifies the access point that the station is in a power saving mode during antenna evaluation and, when the antenna evaluation is complete, notifies the access point of the end of the power saving mode. When recognizing that the station is in the power saving mode, the access point stops transmitting the data packet. Thus, the situation in which when a diversity function executes an antenna evaluation process, repetition of retransmission of a data packet, thereby disconnecting communication, is avoided.

10 Claims, 7 Drawing Sheets

COMMUNICATION SYSTEM, INFORMATION PROCESSING APPARATUS, AND COMMUNICATION CONTROL METHOD

BACKGROUND OF THE INVENTION

1. Field of the Invention

The present invention relates to a communication control technique in an information processing apparatus.

2. Description of the Related Art

Conventionally, several methods have been proposed for implementing a diversity function of acquiring a signal with a high signal-to-noise ratio (SNR) using a plurality of antennas arranged in a space. In a method of implementing a diversity function with a simple configuration, one receiver system is built, and an antenna with a highest SNR is selected by switching an antenna switch for receiver input (see, e.g., Japanese Patent Laid-Open No. 6-303220).

When a wireless network complying with IEEE802.11 (to be referred to as a wireless LAN hereinafter) is used, generally, the SNR of a beacon periodically transmitted from an access point (AP) is used, and antenna evaluation is executed by comparing the SNRs of respective antennas. An antenna is selected based on the result of the antenna evaluation.

More specifically, when the SNR of a beacon (beacon 1) received via the first antenna in use becomes lower than a predetermined value, a station (STA) switches to the second antenna. The STA compares the SNR of beacon 1 received via the first antenna with the SNR of a next beacon (beacon 2) received via the second antenna. If the SNR of the first antenna is higher than that of the second antenna, the STA switches back to the first antenna and continues the communication; otherwise, the STA continues the communication using the second antenna. As described above, the STA evaluates each antenna, determines a selected antenna, and continues the communication.

However, if the antenna evaluation process starts, and a switch to the second antenna is made, the STA cannot transmit/receive a data packet until the selected antenna is determined.

This causes the AP to retransmit the data packet many times. The AP which has retransmitted a predetermined number of times (a predetermined period of time) or more determines that it is impossible to communicate with the STA, and disconnects the communication.

As described above, if the diversity function executes the antenna evaluation process, it may occur that retransmission of a data packet is repeated until the antenna evaluation process is completed, which causes the communication to be disconnected.

SUMMARY OF THE INVENTION

The present invention has been made in consideration of the above problems.

A communication system according to the present invention has the following configuration. That is, there is provided a communication system comprising an information processing apparatus which connects to a plurality of antennas, and a base station, wherein the information processing apparatus comprises an evaluation unit configured to evaluate reception states of the plurality of antennas, and a stop instruction unit configured to cause the base station to stop transmitting information when the evaluation unit executes evaluation.

An information processing apparatus according to the present invention has the following configuration. That is, there is provided an information processing apparatus, comprising:

an evaluation unit configured to evaluate reception states of a plurality of antennas; and a stop instruction unit configured to cause a communication partner to stop transmitting information when the evaluation unit executes evaluation.

A communication control method according to the present invention has the following configuration. That is, there is provided a communication control method for an information processing apparatus, comprising a step of causing a communication partner to stop transmitting information when the information processing apparatus evaluates reception states of a plurality of antennas.

According to the present invention, it is possible to prevent communication from being disconnected, even when a diversity function executes an antenna evaluation process.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

An information processing apparatus (station) according to each of the following embodiments transmits, to an access point, a packet representing that the apparatus itself is in a power saving mode before switching to the second antenna. The apparatus transmits, to the access point (AP), a packet representing the end of the power saving mode after a selected antenna is determined. This allows the AP to suspend transmission of a data packet during the power saving mode. It is therefore possible to avoid a situation in which communication is disconnected when the AP repeats retransmission of a data packet.

First Embodiment

<Configuration of Communication System>

Figure 1:
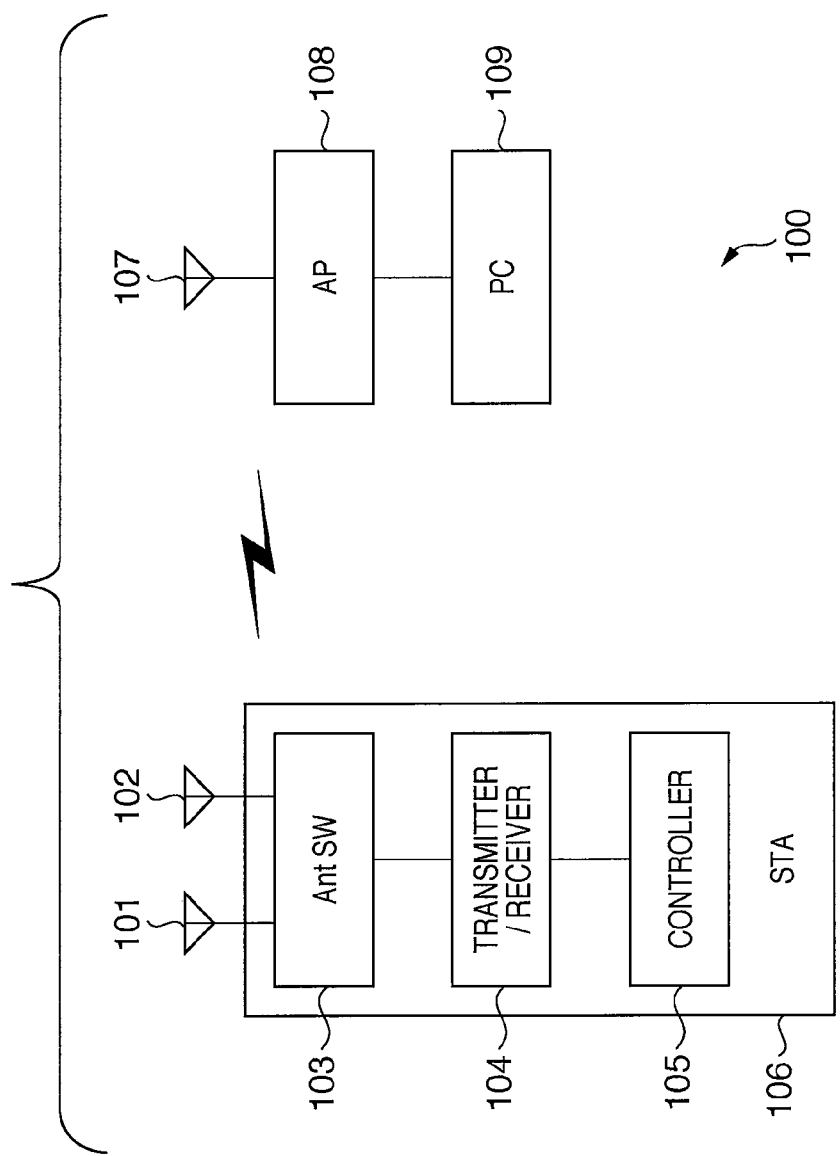
FIG. 1 is a view showing a configuration example of a communication system 100 comprising a station (information processing apparatus) which includes a diversity function, and an access point which transmits information to the station.

FIG. 1 is a view showing a configuration example of a communication system 100 comprising a station (information processing apparatus) which has a diversity function, and an access point serving as a base station which transmits information to the station.

An AP 108 is wirelessly connected with an STA 106 using an IEEE802.11 wireless LAN via antennas 107 and 101 or antennas 107 and 102. Since the STA 106 communicates via the AP 108, a communication partner of the STA 106 is the AP 108 in this embodiment.

The station (STA) 106 is connected with the two antennas, that is, the antennas 101 and 102, and has the diversity function.

A controller 105 selects one of the antennas 101 and 102 on the basis of the result of an antenna evaluation process in a transmitter/receiver 104. The controller 105 instructs an antenna switch 103 to electrically connect the selected antenna and the transmitter/receiver 104, and performs an antenna switching operation.

The transmitter/receiver 104 has a transmission circuit and a reception circuit, and time-divisionally switches transmission and reception by using a transmission/reception selection switch. The transmitter/receiver 104 has an RF function, BB function, and MAC function, and implements the antenna evaluation process by the MAC function. Note that in the antenna evaluation process, in order to select an optimal antenna, a signal reception state is evaluated by comparing the signal-to-noise ratios (SNRs) of signals which have been received by a plurality of antennas respectively.

In this embodiment, as an example of reception state evaluation, a signal reception level is evaluated by comparing SNRs. The controller 105 selects an antenna with a higher SNR on the basis of the result of the antenna evaluation process, that is, the result of the SNR comparison, and instructs the antenna switch 103 to electrically connect the selected antenna and the transmitter/receiver 104. The antenna switch 103 executes the switching operation of connecting the transmitter/receiver 104 and the antenna 101 or 102 on the basis of the instruction from the controller 105.

The access point (AP) 108 has the antenna 107, and is connected, via a cable of 100Base-TX standard, with a PC (Personal Computer) 109 which provides information to be transmitted to the station 106.

The AP 108 periodically (e.g., every 100 ms) sends a beacon. The STA which has received the beacon (notification signal) performs wireless communication within a network formed by the AP on the basis of various pieces of information contained in the beacon. For example, the beacon contains various pieces of information on the network formed by the AP, such as period information of beacon transmission, a network identifier to identify the network formed by the AP, and information on a frequency channel in use. The various pieces of information contained in the beacon in this embodiment are defined by the IEEE802.11 standard.

<Antenna Switching Procedure in Communication System>

Figure 2:
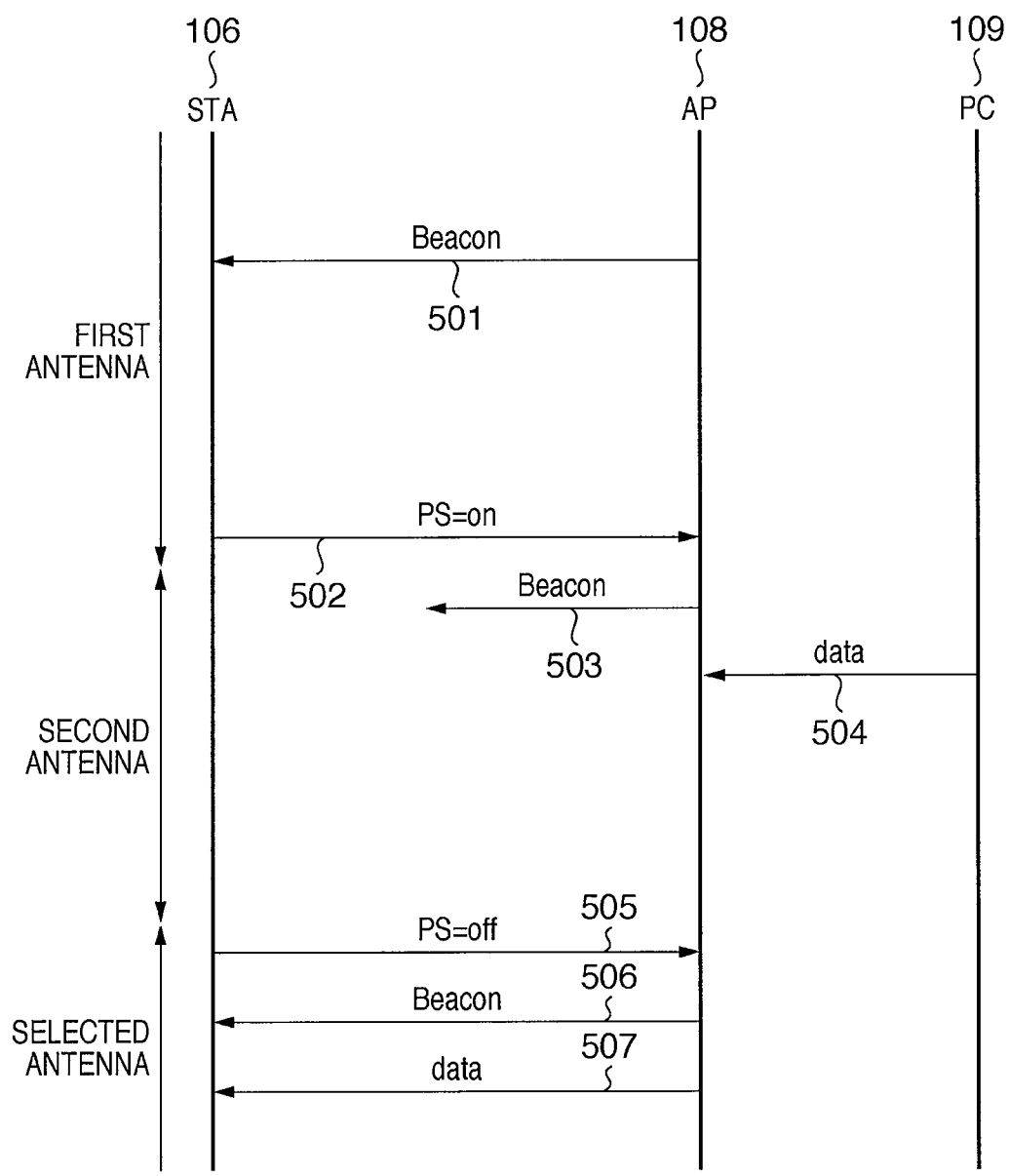
FIG. 2 is a sequence chart showing an antenna switching procedure in the communication system 100 (the first embodiment)

An antenna switching procedure executed by the diversity function, according to this embodiment, of the STA 106 in the communication system 100 will be described. FIG. 2 is a sequence chart showing the antenna switching procedure in the communication system 100. In the following explanation, assume that the first antenna, which is selected at the start of the antenna evaluation process and is wirelessly connected (in use), is the antenna 101, and the second antenna, which is a comparison target in executing the antenna evaluation, is the antenna 102.

The STA 106 receives a beacon 501 using the first antenna (antenna 101), and holds the SNR (signal level) of the received beacon 501 (the first holding means). Assume that the SNR of the received beacon 501 is lower than a preset threshold.

In this case, before the end of a beacon interval until a next beacon is transmitted, the controller 105 of the STA 106 transmits, to the AP 108, a NULL packet 502 in which a power management (PM) bit has been set to 1 to indicate that the STA 106 will enter the power saving mode. The controller 105 switches to the second antenna (antenna 102) before the end of the beacon interval. The second antenna (antenna 102) receives a beacon 503 transmitted by the AP 108, and holds the SNR of the received beacon 503 (the second holding means).

Assume that the PC 109 transmits, to the AP 108, data 504 addressed to the STA 106 during the next beacon interval. At this time, since the AP 108 recognizes that the STA 106 is in the power saving mode, the AP 108 holds the data 504 without transmitting it during the beacon interval. That is, the NULL packet 502 in which the PM bit has been set to 1 serves as a stop instruction signal for instructing the AP 108 to stop transmitting a data packet. The switch to the second antenna (antenna 102) is made after the stop instruction.

The transmitter/receiver 104 compares the SNR of the beacon 501 received by the first antenna (antenna 101) with that of the beacon 503 received by the second antenna (antenna 102). The controller 105 determines the antenna with a higher SNR as the selected antenna on the basis of the comparison result. The controller 105 executes the switching instruction to control the antenna switch 103 to electrically connect the determined selected antenna and the transmitter/receiver 104. The antenna switch 103 executes the switching process of electrically connecting the selected antenna and the transmitter/receiver 104 in accordance with the instruction from the controller 105. The STA 106 therefore receives a beacon 506 using the selected antenna during the next beacon interval.

After controlling the antenna switch 103 to switch to the selected antenna, the controller 105 transmits a NULL packet 505 with a PM bit=0 representing the end of the power saving mode to the AP 108, and ends the antenna evaluation process.

Having received a NULL packet 505 with a PM bit=0 representing cancellation of the power saving mode, the AP 108 transmits held data packets 507 to the STA 106. That is, a NULL packet 505 in which the PM bit has been set to 0 serves as a start instruction signal for instructing to start transmission of data packets 507.

The STA 106 receives, via the selected antenna, data packets 507 transmitted from the AP 108.

<Antenna Evaluation Process Procedure in STA>

Figure 3:
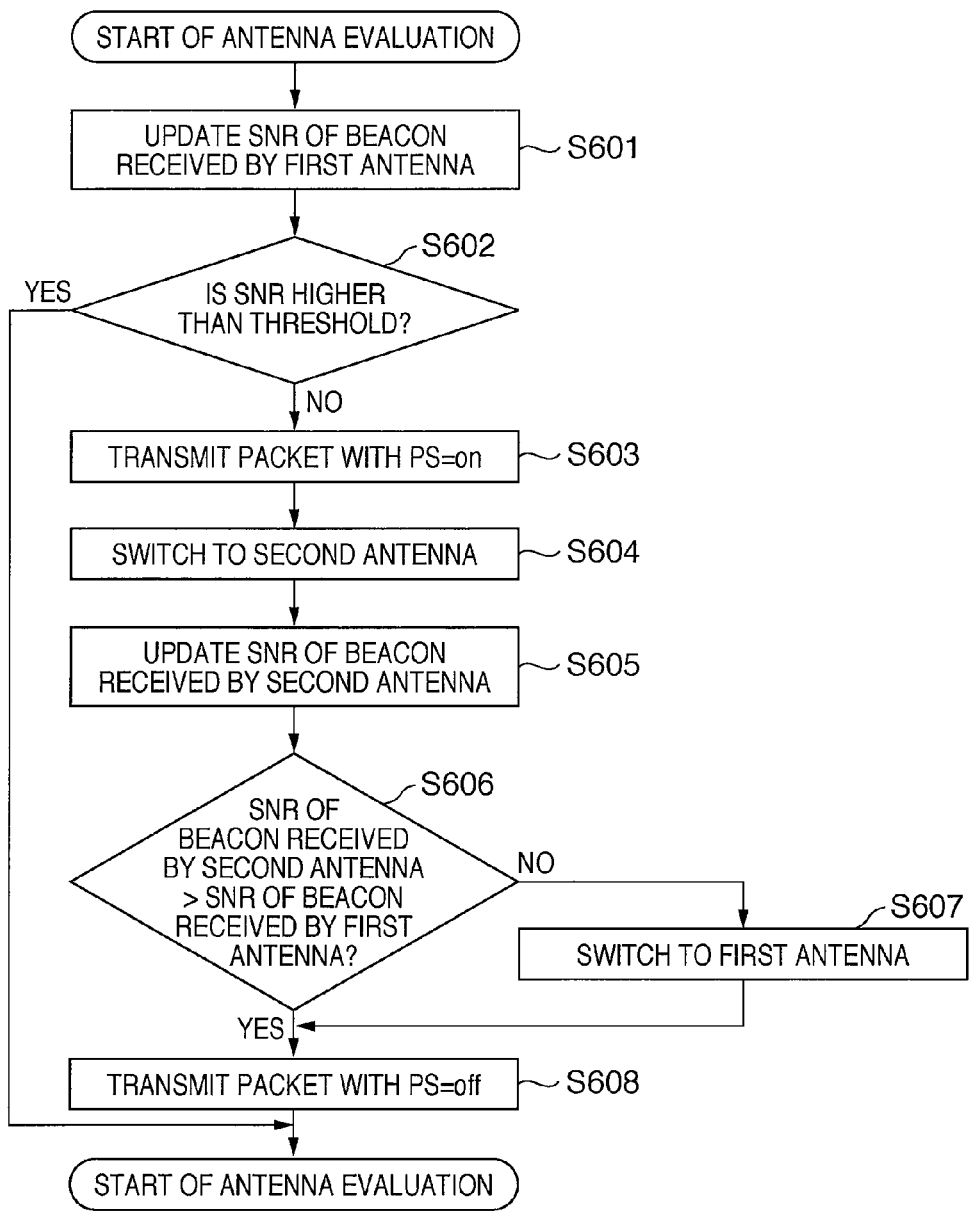
FIG. 3 is a flowchart showing an antenna evaluation process procedure in a transmitter/receiver 104 of an STA 106 (the first embodiment)

Communication control based on the antenna evaluation process procedure in the STA 106 will be described next with reference to FIG. 3. The following process is performed when the controller 105 and/or transmitter/receiver 104 executes a control program stored in a memory (not shown) of the STA 106.

When the STA 106 starts the antenna evaluation process, the transmitter/receiver 104 receives a beacon via the first antenna (antenna 101), and holds the SNR of the received beacon in step S601. That is, upon reception of the beacon via the antenna 101, the transmitter/receiver 104 obtains the SNR of the received beacon, and stores and holds the obtained SNR in the memory.

In step S602, the controller 105 determines whether the SNR of the beacon obtained by the transmitter/receiver 104 is greater than or equal to the predetermined threshold. If the controller 105 determines that the SNR of the beacon is greater than or equal to the predetermined threshold, it determines that the antenna need not be switched, and ends the antenna evaluation process.

On the other hand, if the controller 105 determines in step S602 that the SNR of the beacon obtained by the transmitter/receiver 104 is lower than the predetermined threshold, the process advances to step S603. In step S603, the controller 105 transmits a NULL packet with the PM bit=1 to the AP 108.

In step S604, upon reception of an ACK packet (reception acknowledgement signal of the NULL packet) transmitted by the AP 108, the controller 105 sends a switching instruction to the antenna switch 103 instructing it to connect to the second antenna (antenna 102).

In step S605, the controller 105 determines whether a beacon is received via the antenna 102 within a predetermined period of time. If the controller 105 determines that the beacon is received, the transmitter/receiver 104 holds the SNR of the received beacon; otherwise, the transmitter/receiver 104 holds the SNR of 0.

In step S606, the transmitter/receiver 104 compares the SNR of the beacon received by the antenna 101 with that of the beacon received by the antenna 102, and notifies the controller 105 of the comparison result. If the controller 105 determines that the SNR of the beacon received by the antenna 102 is higher, it determines the antenna 102 as the selected antenna, and the connection with the antenna 102 is maintained. The process advances to step S608.

On the other hand, if the controller 105 determines that the SNR of the beacon received by the antenna 101 is higher than that of the beacon received by the antenna 102, it determines the antenna 101 as the selected antenna, and the process advances to step S607. The controller 105 sends the switching instruction to the antenna switch 103 to connect to the antenna 101 in step S607, and the process advances to step S608.

In step S608, the controller 105 transmits a NULL packet containing a PM bit=0 to the AP 108, and ends the antenna evaluation process.

Note that the antenna evaluation process may be periodically executed, or may be executed at all times. Executing the antenna evaluation process at all times means that the antenna evaluation process starts immediately after the end of the antenna evaluation process.

A period of time during which each antenna receives a beacon to compare SNRs is not limited to one beacon interval, and the SNRs of beacons received during a plurality of beacon intervals may be averaged and then the average values may be used.

The antenna evaluation process is not limited to that triggered by a decrease in the SNR of the beacon received by the first antenna, and may be triggered by a change in, for example, a transmission/reception rate, a frame error rate, or the number of frame errors.

As is apparent from the above explanation, in this embodiment, if the second antenna is evaluated when the SNR of the beacon received by the first antenna decreases, the AP is notified of a packet representing that the STA is in the power saving mode before the switch to the second antenna is made.

This allows the AP to operate to suspend transmission of a data packet to the STA. It is therefore possible to avoid a situation in which the AP disconnects the communication with the STA due to communication failure.

Second Embodiment

In the above first embodiment, if the second antenna is evaluated when the SNR of the beacon received by the first antenna decreases, the STA continues to be in the power saving mode until the evaluation is completed and the switch to the selected antenna is completed. However, the present invention is not limited to this. That is, to evaluate the second antenna, the STA may end the power saving mode and receive the data packet from the AP if the beacon can be received after the switch to the second antenna is made. After the reception of the data packet is completed, the SNR of the beacon received by the first antenna may be compared with that of the beacon received by the second antenna, and the selected antenna may be determined.

The second embodiment of the present invention will be described in detail below.

The configuration of a communication system according to this embodiment is the same as that in FIG. 1, and a description thereof will be omitted.

<Processing Procedure in Communication System>

Figure 4:
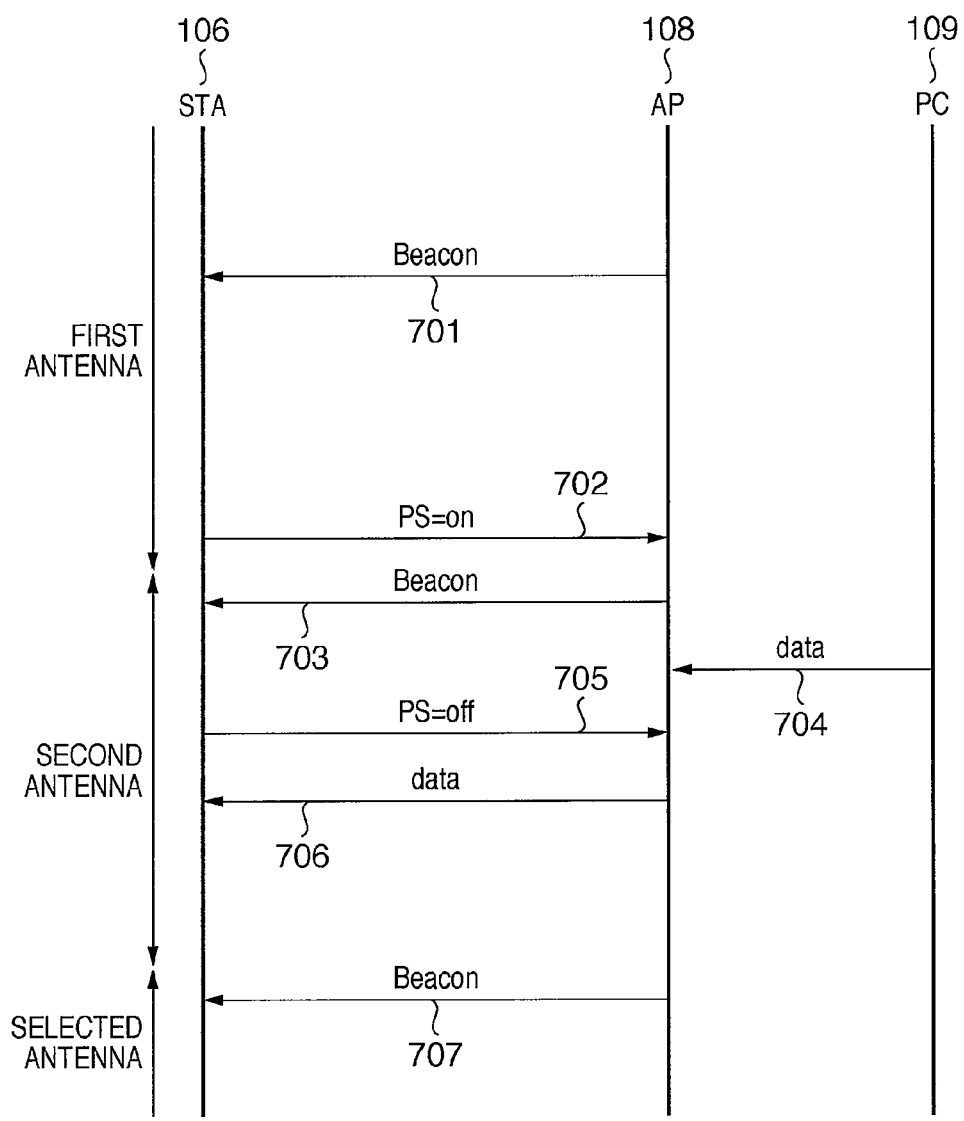
FIG. 4 is a sequence chart showing an antenna switching procedure in a communication system 100 (the second embodiment)

An antenna switching procedure executed by a diversity function, according to this embodiment, of an STA 106 in a communication system 100 will be described. FIG. 4 is a sequence chart showing the antenna switching procedure in the communication system 100. In the following explanation, similar to the above first embodiment, assume that the first antenna, which is selected at the start of the antenna evaluation process and is wirelessly connected, is an antenna 101, and the second antenna, which is a comparison target in executing the antenna evaluation, is an antenna 102.

The STA 106 receives a beacon 701 using the first antenna (antenna 101), and holds the SNR of the received beacon 701. Assume that the SNR of the received beacon 701 is lower than a preset threshold.

In this case, before the end of a beacon interval until the next beacon is transmitted, a controller 105 of the STA 106 transmits, to an AP 108, a NULL packet 702 in which a power management (PM) bit has been set to 1 representing that the STA 106 will enter the power saving mode. The controller 105 switches to the antenna 102 before the end of the beacon interval. The antenna 102 receives a beacon 703 transmitted by the AP 108.

Assume that a PC 109 transmits, to the AP 108, data 704 addressed to the STA 106 during the next beacon interval. At this time, since the AP 108 recognizes that the STA 106 is in the power saving mode, the AP 108 holds the data 704.

If the controller 105 can receive the beacon 703 after the antenna is switched, the controller 105 transmits a NULL packet 705 with a PM bit=0 representing the end of the power saving mode to the AP 108.

Upon reception of the NULL packet 705 with a PM bit=0, the AP 108 recognizes that the STA 106 is no longer in the power saving mode, and transmits held data packets 706 to the STA 106.

The STA 106 receives data packets 706 transmitted by the AP 108. Upon completion of the reception of the data packets 706, the STA 106 compares the SNR of the beacon 703 received by the antenna 102 with that of the beacon 701 received by the antenna 101. As a result, if the SNR of the beacon received by the antenna 101 is higher than that of the beacon received by the antenna 102, the controller 105 determines the antenna 101 as the selected antenna. After sending the switching instruction to control an antenna switch 103 to connect with the antenna 101, the controller 105 ends the antenna evaluation process. On the other hand, if the SNR of the beacon received by the antenna 102 is higher, the controller 105 determines the antenna 102 as the selected antenna, and maintains the connection with the antenna 102.

Consequently, the STA 106 receives a beacon 707 via the selected antenna during the next beacon interval.

<Antenna Evaluation Process Procedure in STA>

Figure 5:
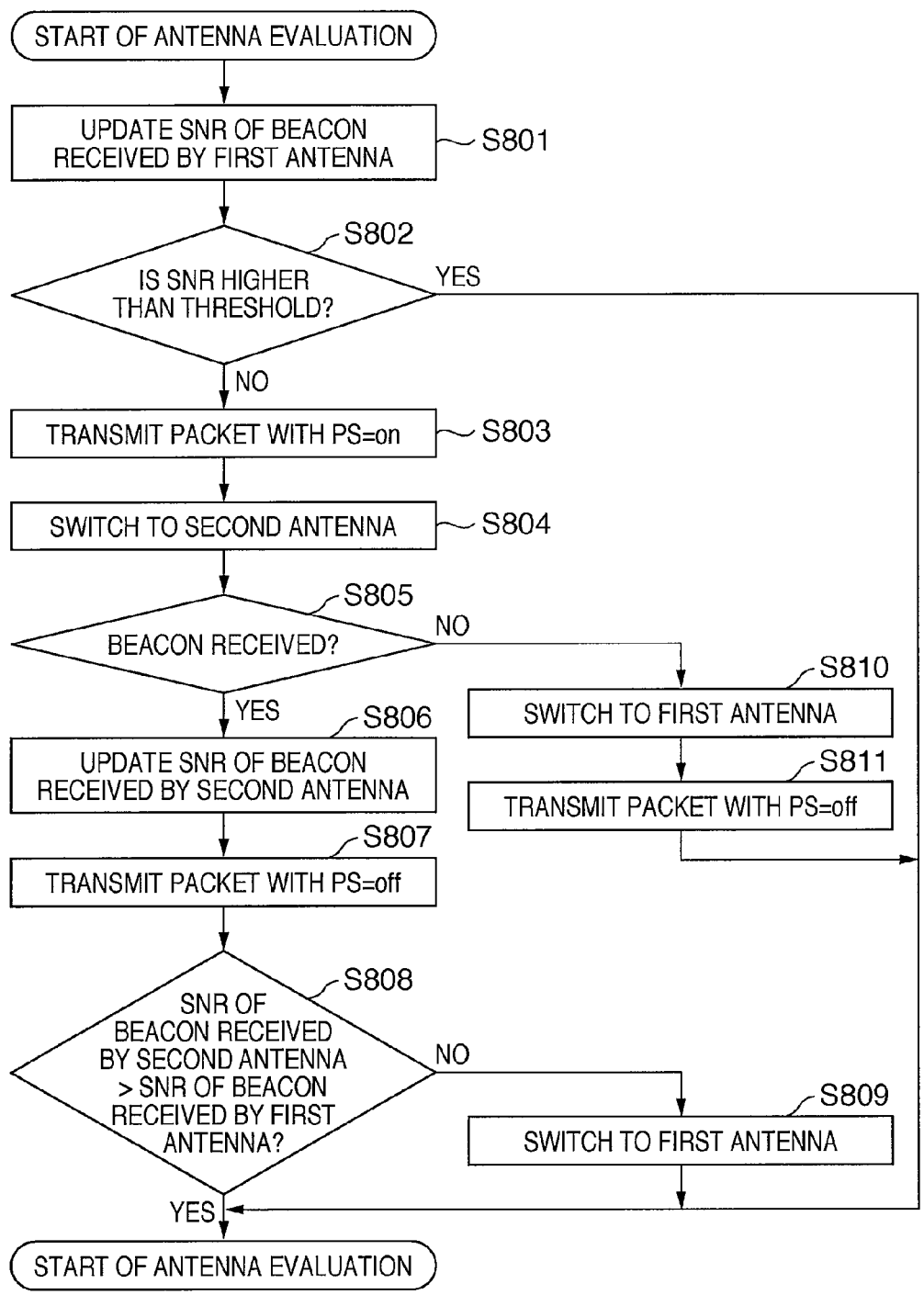
FIG. 5 is a flowchart showing an antenna evaluation process procedure in a transmitter/receiver 104 of an STA 106 (the second embodiment)

The communication control based on the antenna evaluation process procedure in the STA 106 will be described next with reference to FIG. 5. The following process is performed when the controller 105 and/or a transmitter/receiver 104 executes a control program stored in a memory (not shown) of the STA 106.

When the STA 106 starts the antenna evaluation process, the transmitter/receiver 104 receives a beacon via the first antenna (antenna 101), and holds the SNR of the received beacon in step S801. That is, upon reception of the beacon via the antenna 101, the transmitter/receiver 104 obtains the SNR of the received beacon, and stores and holds the obtained SNR in the memory.

In step S802, the controller 105 determines whether the SNR of the beacon is greater than or equal to the predetermined threshold. If the controller 105 determines that the SNR of the beacon is greater than or equal to the predetermined threshold, it determines that the antenna need not be switched, and ends the antenna evaluation process.

On the other hand, if it is determined in step S802 that the SNR of the beacon is lower than the predetermined threshold, the process advances to step S803. In step S803, the controller 105 transmits a NULL packet with a PM bit=1 to the AP 108.

In step S804, upon reception of an ACK packet from the AP 108, the controller 105 sends the switching instruction to the antenna switch 103 to connect with the second antenna (antenna 102).

In step S805, the transmitter/receiver 104 and the controller 105 collaborate to determine whether the beacon has been received via the antenna 102 within the predetermined period of time. If it is determined that the beacon has been received, the process advances to step S806. In step S806, the transmitter/receiver 104 holds the SNR of the beacon received via the antenna 102.

In step S807, the controller 105 transmits a NULL packet containing a PM bit=0 to the AP 108. The AP 108 thus recognizes that the power saving mode has ended, and transmits a data packet to the STA 106. The STA 106 receives the transmitted data packet.

When the reception of the data packet is complete, in step S808 the transmitter/receiver 104 compares the SNR of the beacon held in step S806 with that held in step S801.

If the controller 105 determines in step S808 that the SNR of the beacon which has been received by the antenna 102 and held in step S806 is higher, it determines the antenna 102 as the selected antenna. The controller 105 maintains the connection with the antenna 102, and ends the antenna evaluation process.

Alternatively, if the controller 105 determines in step S808 that the SNR of the beacon which has been received by the antenna 101 and held in step S801 is higher than that of the beacon received by the antenna 102, the process advances to step S809. In step S809, the controller 105 determines the antenna 101 as the selected antenna, sends a switching instruction to the antenna switch 103 to connect with the antenna 101, and ends the antenna evaluation process.

If it is determined in step S805 that the beacon cannot be received within the predetermined period of time, the process advances to step S810. In step S810, the controller 105 determines the antenna 101 as the selected antenna, and sends a switching instruction to the antenna switch 103 to connect with the antenna 101.

In step S811, the controller 105 transmits a NULL packet containing a PM bit=0 to the AP 108. The AP 108 therefore determines that the power saving mode has ended, and transmits a data packet to the STA 106. The STA 106 receives the transmitted data packet. After transmitting the NULL packet to the AP 108 in step S811, the controller 105 ends the antenna evaluation process.

As is apparent from the above explanation, in this embodiment, the second antenna is evaluated when the SNR of the beacon received by the first antenna decreases. In this case, if the second antenna can receive the beacon, the power saving mode ends.

This allows the AP to immediately transmit, to the STA, the data packet whose transmission has been suspended. It is therefore possible to avoid a situation in which the AP disconnects the communication with the STA owing to a communication failure.

In this embodiment, if the second antenna cannot receive the beacon, the first antenna is determined to be the selected antenna; otherwise, after the data packet is received, the SNRs of the beacons which have been received by the first and second antennas respectively are compared, and the selected antenna is determined.

This makes it possible to select an appropriate antenna while a data packet is being received, even if the antenna evaluation process is executed.

Third Embodiment

Although beacons are used to execute the antenna evaluation process in the above first embodiment, the present invention is not limited to this. For example, a response signal to data transmission from the STA 106 may be used to perform the antenna evaluation process.

The third embodiment of the present invention will be described in detail below.

The configuration of a communication system according to this embodiment is the same as that in FIG. 1, and a description thereof will be omitted.

<Antenna Switching Procedure in Communication System>

Figure 6:
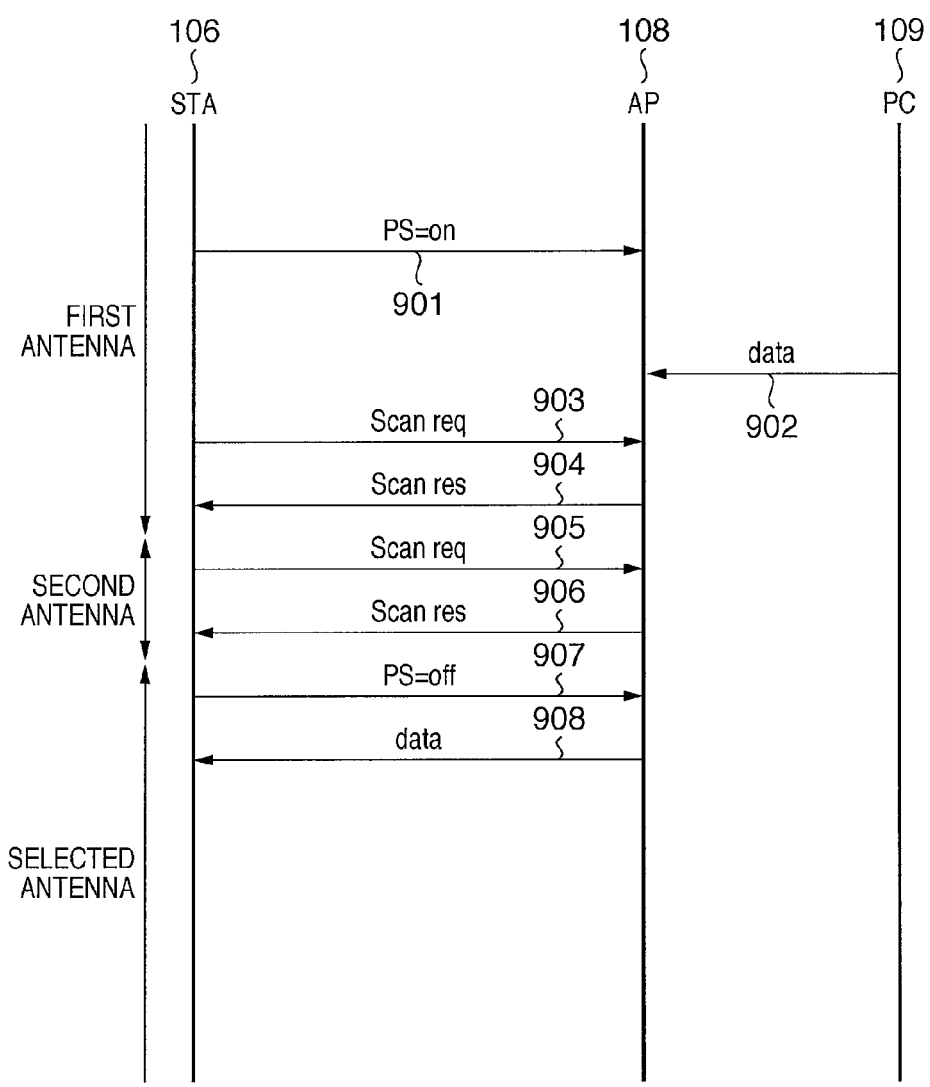
FIG. 6 is a sequence chart showing an antenna switching procedure in a communication system 100 (the third embodiment)

An antenna switching procedure executed by a diversity function, according to this embodiment, of an STA 106 in a communication system 100 will be described. FIG. 6 is a sequence chart showing the antenna switching procedure in the communication system 100. In the following explanation, assume that the first antenna which is selected at the start of the antenna evaluation process and is wirelessly connected is an antenna 101, and the second antenna which is a comparison target in executing the antenna evaluation is an antenna 102, similarly to the above first embodiment.

When a controller 105 of the STA 106 determines that the communication state at the first antenna (antenna 101) deteriorates, it starts the antenna evaluation process. When the antenna evaluation process starts, the STA 106 transmits a packet 901 containing a PM bit=1 to an AP 108. Based on the packet 901, the AP 108 recognizes that the STA 106 is in a power saving mode, and holds a data packet 902 from a PC 109.

The controller 105 transmits a scan request packet 903 containing the PM bit=1 to the AP 108 by using the antenna 101. In response to the scan request packet 903, the AP 108 transmits a scan response 904 to the STA 106 irrespective of the PM bit. A transmitter/receiver 104 of the STA 106 holds the SNR of the scan response 904 transmitted by the AP 108 (the first holding means).

After switching to the second antenna (antenna 102), the controller 105 of the STA 106 transmits a scan request packet 905 containing a PM bit=1 to the AP 108. The AP 108 transmits, to the STA 106, a scan response 906 to the scan request packet 905. The STA 106 holds the SNR of the transmitted scan response 906 (the second holding means).

The transmitter/receiver 104 of the STA 106 compares the SNR of the scan response 904 with that of the scan response 906. As a result, if the SNR of the scan response 904 is higher than that of the scan response 906, the controller 105 determines the antenna 101 as the selected antenna. After sending a switching instruction to an antenna switch 103 to connect with the antenna 101, the controller 105 transmits a packet 907 containing a PM bit=0 to the AP 108, and ends the antenna evaluation process. The AP 108 therefore recognizes that the STA 106 is no longer in the power saving mode, and transmits a held data packet 908 to the STA 106. If the SNR of the scan response 906 is higher, the controller 105 determines the antenna 102 as the selected antenna, and maintains the connection with the antenna 102.

<Antenna Evaluation Process Procedure in STA>

Figure 7:
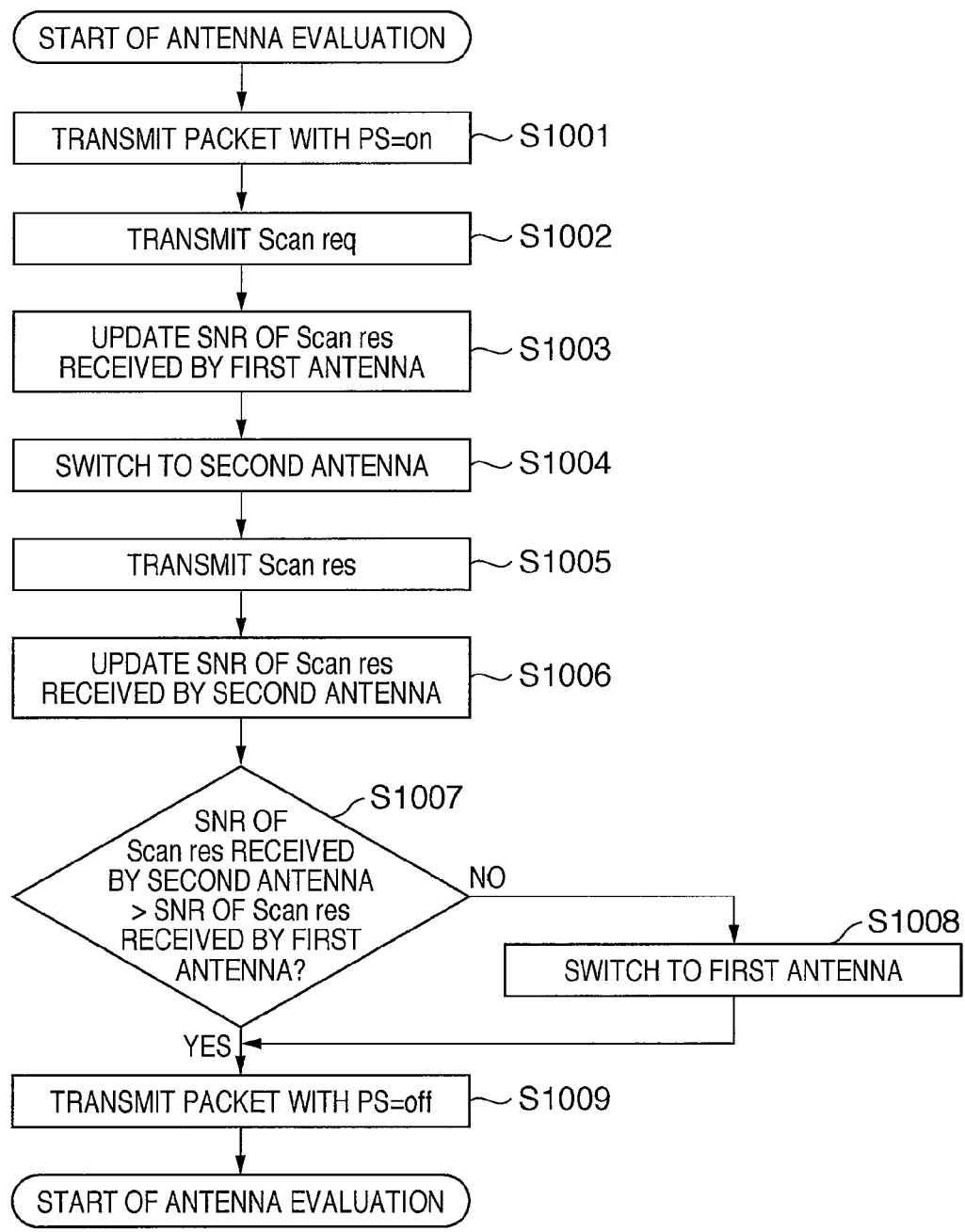
FIG. 7 is a flowchart showing an antenna evaluation process procedure in a transmitter/receiver 104 of an STA 106 (the third embodiment).

The communication control based on the antenna evaluation process procedure in the STA 106 will be described next with reference to FIG. 7. The following process is done when the controller 105 and/or transmitter/receiver 104 executes a control program stored in a memory (not shown) of the STA 106.

If the controller 105 of the STA 106 determines that the communication state at the first antenna (antenna 101) deteriorates, it starts the antenna evaluation process. When the STA 106 starts the antenna evaluation process, the controller 105 transmits a packet containing the PM bit=1 to the AP 108 via the first antenna (antenna 101) in step S1001.

In step S1002, the controller 105 transmits a scan request packet to the AP 108 via the antenna 101. In step 1003, the controller 105 receives a scan response from the AP 108 via the first antenna (antenna 101), and holds the SNR of the scan response. If the controller 105 does not receive the scan response from the AP 108, it holds the SNR of 0.

In step S1004, the controller 105 switches to the second antenna (antenna 102). In step S1005, the controller 105 transmits a scan request packet to the AP 108 via the second antenna (antenna 102).

In step S1006, the controller 105 receives a scan response from the AP 108 via the second antenna (antenna 102) and the transmitter/receiver 104 holds the SNR of the received scan response. If the controller 105 does not receive the scan response, the transmitter/receiver 104 holds the SNR of 0.

In step S1007, the transmitter/receiver 104 compares the SNR held in step S1003 with that held in step S1006. The controller 105 determines based on the result of the comparison in the transmitter/receiver 104 whether the SNR held in step S1006 is higher than that held in step S1003. If the SNR held in step S1006 is higher, the controller 105 determines the antenna 102 as the selected antenna, and maintains the connection with the antenna 102.

If the SNR held in step S1003 is higher than that held in step S1006, the controller 105 determines the antenna 101 as the selected antenna and the process advances to step S1008. In step S1008, the controller 105 sends a switching instruction to the antenna switch 103 to connect with the antenna 101. The process advances to step S1009.

In step S1009, the controller 105 transmits a packet containing a PM bit=0 to the AP 108, and ends the antenna evaluation process.

As is apparent from the above explanation, in this embodiment, when the antenna evaluation process starts, the AP is notified of the packet representing that the STA is in the power saving mode.

This allows the AP to operate to suspend transmission of a data packet to the STA. It is therefore possible to avoid a situation in which the AP disconnects the communication with the STA owing to a communication failure.

To compare the first and second antennas, in this embodiment, the SNR of the scan response to the scan request packet transmitted by the STA is used. This makes it possible to execute the antenna evaluation process in a short time.

Other Embodiments

The present invention may be applied to a system including a plurality of devices (e.g., a host computer, interface device, reader, and printer) or an apparatus (e.g., a copying machine, or facsimile apparatus) formed by a single device.

The object of the present invention is also achieved when a recording medium which records software program codes for implementing the functions of the above-described embodiments is supplied to a system or apparatus. The above functions are implemented when the computer (or the CPU or MPU) of the system or apparatus reads out and executes the program codes stored in the recording medium. In this case, the recording medium which records the program codes constitutes the present invention.

As a recording medium for supplying the program codes, a Floppy® disk, a hard disk, an optical disk, a magnetooptical disk, a CD-ROM, a CD-R, a magnetic tape, a nonvolatile memory card, a ROM, or the like can be used.

The functions of the above-described embodiments are implemented when the computer executes the readout program codes. Also, the functions of the above-described embodiments are implemented when an OS (Operating System) or the like running on the computer performs some or all of actual processes on the based on the instructions of the program codes.

Furthermore, the present invention includes a case in which, after the program codes read out from the recording medium are written in the memory of a function expansion board inserted into the computer or the memory of a function expansion unit connected to the computer, the functions of the above-described embodiments are implemented. That is, the present invention includes a case in which, after the program codes are written in the memory, the CPU of the function expansion board or function expansion unit performs some or all of actual processes based on the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-181448 filed on Jul. 10, 2007, which is hereby incorporated by reference herein in its entirety.

What is claimed is:

1. A communication system comprising an information processing apparatus which connects to a plurality of antennas, and a base station, wherein said information processing apparatus comprises an evaluation unit configured to evaluate reception states of the plurality of antennas, and a stop instruction unit configured to cause said base station to stop transmitting information when said evaluation unit executes evaluation.

2. An information processing apparatus, comprising:
an evaluation unit configured to evaluate reception states of a plurality of antennas; and
a stop instruction unit configured to cause a communication partner to stop transmitting information when said evaluation unit executes evaluation.

3. The apparatus according to claim 2, wherein
the communication partner transmits a notification signal for periodic notification, and transmits information to said information processing apparatus, and
said stop instruction unit instructs to stop transmitting the information to said information processing apparatus.

4. The apparatus according to claim 2, wherein said stop instruction unit causes the communication partner to stop transmitting the information by transmitting, to the communication partner, information notifying that said apparatus is in a power saving mode.

5. The apparatus according to claim 2, wherein said evaluation unit includes a selection unit configured to select one of a first antenna and a second antenna on the basis of comparison of a level of a signal received by the first antenna and a level of a signal received by the second antenna.

6. The apparatus according to claim 2, wherein said evaluation unit starts the evaluation of the plurality of antennas when a level of a signal received by an antenna in use becomes lower than a predetermined threshold.

7. The apparatus according to claim 2, wherein said evaluation unit has a switching unit configured to switch to another antenna when a level of a signal received by an antenna in use becomes lower than a predetermined threshold, and after said switching unit switches the antenna, executes the antenna evaluation on the basis of a signal reception level at the antenna before the switch is made and a signal reception level at the antenna after the switch is made.

8. The apparatus according to claim 7, by further comprising:
a canceling unit configured to, after said switching unit switches the antenna, cancel the stop of the information transmission of the communication partner on the basis of reception state of the switched antenna.

9. The apparatus according to claim 2, further comprising:
a canceling unit configured to cancel the stop of the information transmission of the communication partner when the antenna selection based on a result of the evaluation executed by said evaluation unit is complete.

10. A communication control method for an information processing apparatus, comprising a step of causing a communication partner to stop transmitting information when the information processing apparatus evaluates reception states of a plurality of antennas.

* * * * *